United States Patent
Tanabe (10) Patent No.: US 7,783,398 B2
(45) Date of Patent: Aug. 24, 2010

(54) PROGRAM REWRITING SYSTEM AND PROGRAM REWRITING METHOD

(75) Inventor: Itaru Tanabe, Naka (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 11/963,272

(22) Filed: Dec. 21, 2007

(65) Prior Publication Data

US 2008/0133068 A1 Jun. 5, 2008

Related U.S. Application Data

(63) Continuation of application No. 11/354,171, filed on Feb. 15, 2006, now Pat. No. 7,343,239.

(30) Foreign Application Priority Data

Mar. 24, 2005 (JP) ............................. 2005-086796

(51) Int. Cl.
*G06F 19/00* (2006.01)
*G06F 7/22* (2006.01)
*G05D 99/00* (2006.01)

(52) U.S. Cl. ..................... 701/34; 365/185.18; 365/226; 365/185.11

(58) Field of Classification Search ................ 701/102, 701/115; 700/19, 21; 365/185.18, 185.11, 365/226

See application file for complete search history.

(56) References Cited

U.S. PATENT DOCUMENTS 4,509,118 A * 4/1985 Shenk ......................... 711/111
6,009,372 A * 12/1999 Baker et al. ................. 701/115
6,505,084 B2 * 1/2003 Blumenstock ............... 700/21

(Continued)

FOREIGN PATENT DOCUMENTS

DE 197 50 365 A1 5/1999

(Continued)

OTHER PUBLICATIONS

Japanese Office Action including English translation dated Feb. 17, 2010 (Ten (10) pages).

*Primary Examiner*—Thomas G Black
*Assistant Examiner*—Wae Louie
(74) *Attorney, Agent, or Firm*—Crowell & Moring LLP (57) ABSTRACT

Program data stored in the recording medium of a general control apparatus coupled to a network is stored in the recording medium of a control apparatus as a rewritten subject of program data in the following manner. First, program data stored in a recording medium contained within the general control apparatus is sent via the network of a vehicle to the recording medium of a second control apparatus as the rewritten subject of program data (see a path L1). In this case, the program data 21 stored in the recording medium contained in the general control apparatus for generally controlling the control apparatuses is sent to the network of the vehicle when it is determined to be optimum by the CPU 12c of the general control apparatus. The program data sent to the network of the vehicle is sent via the network of the vehicle to the second control apparatus as the rewritten subject of program data. Then, the second control apparatus as the rewritten subject of program data stores the program data sent via the network of the vehicle into the recording medium.

5 Claims, 7 Drawing Sheets

U.S. PATENT DOCUMENTS

| | | |
|---|---|---|
| 6,768,926 B2 * | 7/2004 | Webster et al. ............... 700/19 |
| 6,823,247 B1 | 11/2004 | Issa et al. |
| 6,912,600 B2 * | 6/2005 | Van Brero et al. ............. 710/8 |
| 7,154,786 B2 * | 12/2006 | Ikai et al. ............... 365/185.18 |
| 7,343,239 B2 * | 3/2008 | Tanabe ........................ 701/102 |
| 7,457,945 B2 * | 11/2008 | Dailey et al. .................. 713/2 |
| 2001/0002814 A1 | 6/2001 | Suganuma et al. |
| 2002/0019877 A1 | 2/2002 | Wrede |
| 2008/0133068 A1 * | 6/2008 | Tanabe .......................... 701/1 |

FOREIGN PATENT DOCUMENTS

| | | |
|---|---|---|
| EP | 1 109 085 A2 | 6/2001 |
| JP | 6-272611 | 9/1994 |
| JP | 2001-36539 | 2/2001 |
| JP | 2001-236233 | 8/2001 |
| JP | 2002-157127 A | 5/2002 |
| JP | 2002-163112 | 6/2002 |
| JP | 2003-13795 | 1/2003 |
| JP | 2003-86698 | 3/2003 |
| JP | 2004-28000 | 1/2004 |
| JP | 2004-326689 A | 11/2004 |

* cited by examiner

PROGRAM REWRITING SYSTEM AND PROGRAM REWRITING METHOD

BACKGROUND OF THE INVENTION

The present invention relates to a technique of rewriting a program and, in particular, relates to a technique of rewriting data of programs of control apparatuses efficiently and safely in a system in which the plurality of control apparatuses are coupled via a network within a vehicle.

In a system having a plurality of control apparatuses, there is a case where the program data of a particular one of the plurality of control apparatuses is required to be rewritten. For example, in most cases, a plurality of control apparatuses are provided within the vehicle body of an automobile. The program of such the control apparatus is generally stored in a ROM. Conventionally, in the case of rewriting the program within a ROM, the program data of each of the control apparatuses is rewritten. Such a conventional technique is disclosed in JP-A-6-272611, for example.

SUMMARY OF THE INVENTION

In the case where it is necessary for rewriting programs of a plurality of control apparatuses, it is required to execute the rewriting procedure for each of the control apparatuses. Further, in a control apparatus of an automobile, for example, disposed in a high temperature circumstance, in the case of rewriting program data of the control apparatus, it is not taken into consideration whether the control apparatus is in a normally rewritable state or not.

In such the system having the plurality of control apparatuses, there is a problem that the program data of the plurality of control apparatuses can not be rewritten efficiently.

Further, in the control apparatus disposed in the high temperature circumstance, in the case of rewriting program data of the control apparatus, it is not taken into consideration whether the control apparatus is in the normally rewritable state or not. Thus, the recording medium of the control apparatus, in which program data is rewritten, maybe broken.

Accordingly, the present invention intends to provide a technique which can efficiently rewrite the program data of a plurality of control apparatuses coupled to the network of a vehicle.

The feature of the program rewriting technique according to the present invention resides in that, in the case of rewriting program stored in a ROM within the control apparatus of a vehicle, program is once written in the ROM serving as a buffer from the outside (preparing for the rewriting), and program stored at a predetermined address of the ROM within the control apparatus is rewritten as to a subject satisfying a certain condition at a timing satisfying a certain condition.

According to an aspect of the present invention, there is provided with a program data rewriting system provided within a vehicle, including:

a general control apparatus which is coupled to a network and includes a first recording medium for storing program data as rewriting subject; and a plurality of control apparatuses each of which is coupled to the network and includes a second recording medium for storing program data for exerting a function of the each control apparatus in a manner of being capable of being updated.

The first recording medium serves as a buffer at the time of transferring program data to the second recording medium.

Further, preferably, the first recording medium stores therein in an associated manner, in addition to the program data, an identifier and a condition for transferring data from the first recording medium to the second recording medium so as to rewrite the program data, wherein the identifier specifies the control apparatus as a subject in which program data thereof is rewritten. That is, the first recording medium stores therein the rewriting data, an address of the control apparatus necessary for transferring the rewriting data to the recording medium of a particular or desired control apparatus from the first recording medium, and a transfer condition. The rewriting data in the first recording medium can be transferred to the desired control apparatus at a prescribed timing. A plurality of same or different program data can be stored in parallel into predetermined control apparatuses coupled to the network of a vehicle.

Further, preferably, there is further provided with a data input apparatus which is coupled to the general control apparatus and has an interface between the general control apparatus and outside of the vehicle. Preferably, the data input apparatus has an interface for obtaining data including the program data from outside. Further, preferably, there is further provided with a gateway which is provided between the input apparatus and the general control apparatus and checks security of data including the program data as the writing subject sent from the input apparatus to the general control apparatus. Further, preferably, the control apparatus, as a subject in which program data thereof is rewritten, includes: an environmental data measuring unit which measure at least one of a temperature, a voltage and a lapsed time after stopping of an engine of the vehicle as environmental data around the control apparatus; a third recording medium which stores reference data that is compared with the environmental data measured by the environmental data measuring unit to determine whether or not the condition is satisfied; and a comparing unit which compares the environmental data with the reference data.

According to another aspect of the present invention, there is provided with a program data rewriting method in plural control apparatuses coupled to a network within a vehicle, including the steps of:

at least temporarily storing program data as rewriting subject in a first recording medium of a general control apparatus which is coupled to a network and the plural control apparatuses; and transferring to and storing in a second recording medium, in which program data for exerting a function of the control apparatus is stored, the program data as rewriting subject under a certain condition.

Further, preferably, the program data rewriting method further including the step of: storing in the first recording medium in an associated manner, in addition to the program data, an identifier and a condition for transferring data from the first recording medium to the second recording medium so as to rewrite the program data, wherein the identifier specifies the control apparatus as a subject in which program data thereof is rewritten. That is, the first recording medium stores therein the rewriting data, an address of the control apparatus necessary for transferring the rewriting data to the recording medium of a particular or desired control apparatus from the first recording medium, and a transfer condition. The rewriting data in the first recording medium can be transferred to the desired control apparatus at a prescribed timing. A plurality of same or different program data can be stored in parallel into predetermined control apparatuses coupled to the network of a vehicle. Further, it is possible to provide a program executable by a compute, comprising the aforesaid method.

In order to attain the aforesaid object, the program data rewriting apparatus according to the invention is arranged in a manner that (a plurality or one) rewriting data for rewriting the program of a control apparatus is stored in the recording medium of a predetermined control apparatus coupled to the network of a vehicle and the program data is stored in the recording medium of each of the control apparatuses in which the program data thereof is rewritten, whereby the program data can be rewritten easily. Further, since the control apparatus which executes the program data rewriting procedure is provided with a function of measuring the temperature and voltage of the control apparatus itself and a time period lapsed from the stop of the engine, the program data rewriting procedure can be executed only under the condition that the control apparatus can executed the program data rewriting procedure safely and normally.

According to the present invention, the program data of a plurality of control apparatuses coupled to the network of a vehicle can be rewritten efficiently. Thus, the safety and the cost reduction can be realized in the manufacturing and shipping procedures of a vehicle.

DETAILED DESCRIPTION OF THE INVENTION

Figure 1A:
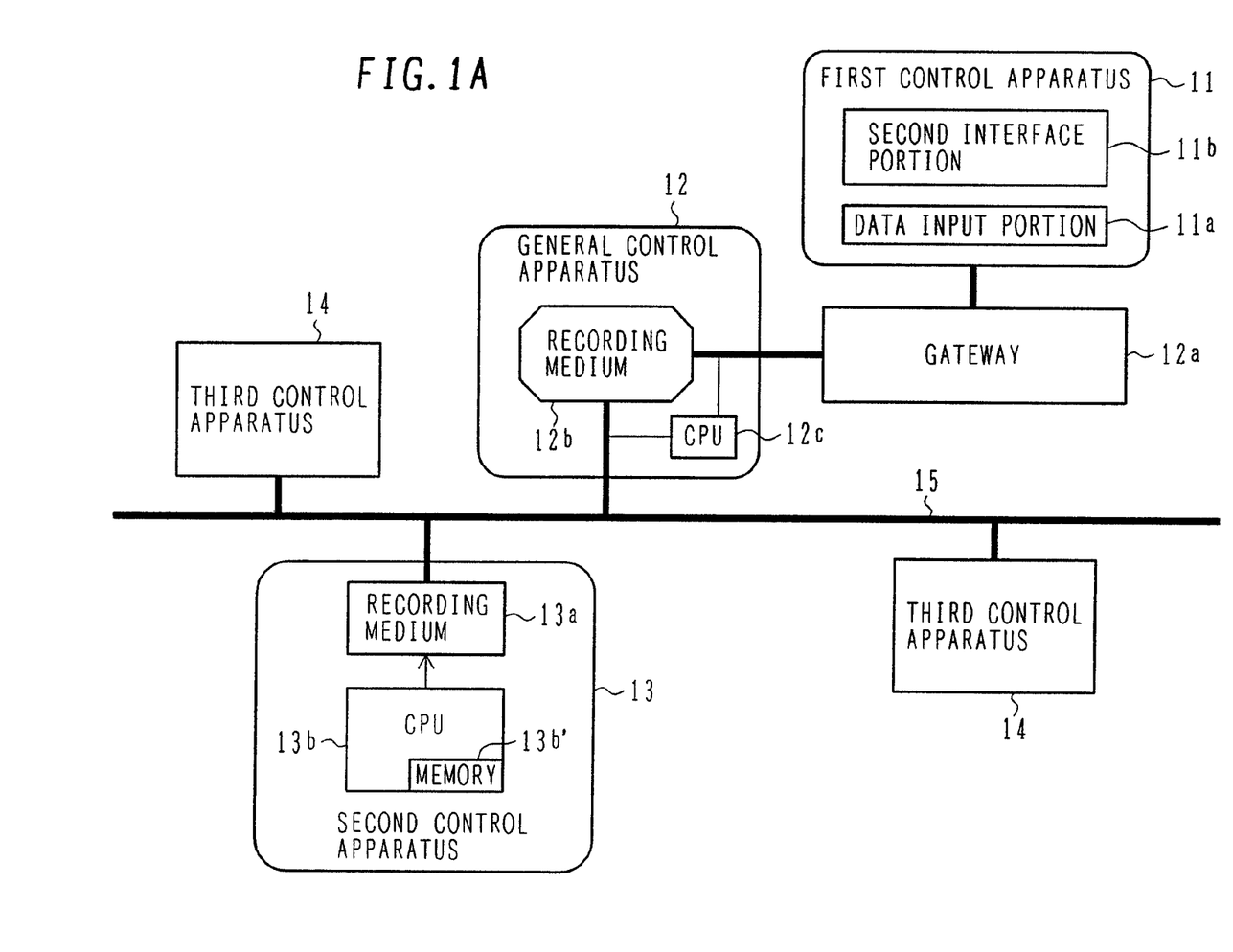
FIG. 1A is a diagram showing an example of the configuration of a program data rewriting system using the network of a vehicle, according to an embodiment of the present invention.
Figure 1B:
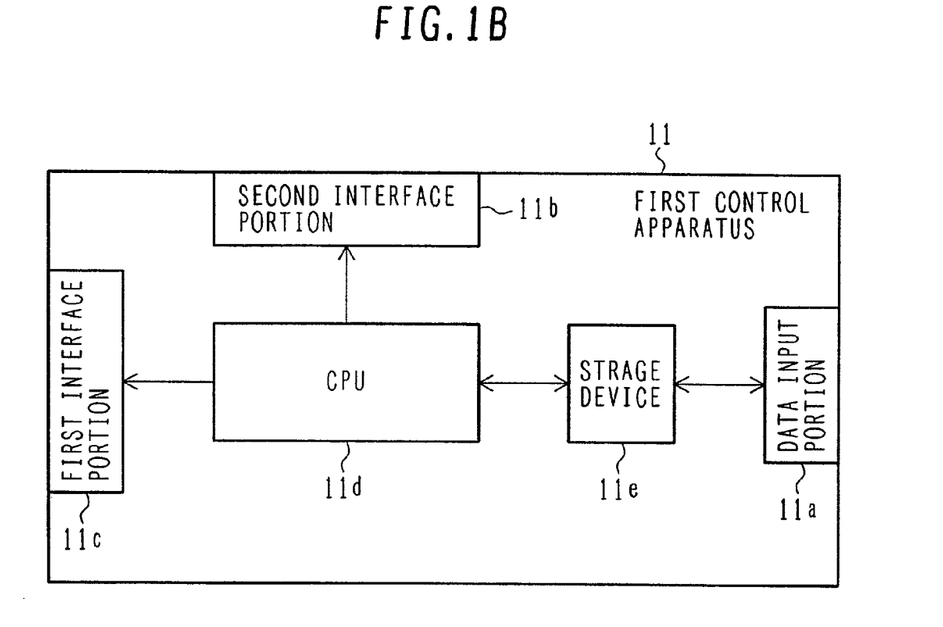
FIG. 1B is a diagram showing an example of a first control apparatus (such as a car navigation apparatus) having an interface function with the outside.

Embodiments of the present invention will be explained hereinafter. FIGS. 1A and 1B are diagrams showing an example of the configuration for realizing the program data rewriting technique which utilizes the program data rewriting technique for a control apparatus according to the embodiment of the present invention. More in detail, these figures show functional block diagrams showing an example of the configuration of the control apparatus within a vehicle. As shown in FIG. 1A, the program data rewriting apparatus according to the embodiment is arranged in a manner that the control apparatuses within a vehicle are coupled to a bus line.

As shown in FIG. 1A, the program data rewriting apparatus according to the embodiment is configured by a first control apparatus (such as a car navigation apparatus) 11 having an interface function between a general control apparatus and the outside, the general control apparatus 12 for controlling a plurality of control apparatuses (such as an ATC, an ABS, an ECU of a vehicle) 13, 14, the second control apparatus 13 (such as the ATC) and the third control apparatuses 14 (such as the ECU), 14 (such as the ABS) in each of which program data thereof is to be rewritten, and a network 15 to which the second and third control apparatuses 13, 14 are coupled. The second and third control apparatuses 13, 14 are the ATC, the ABS and the ECU etc., for example. The general control apparatus 12 is coupled to the first control apparatus 11 having the interface function with the outside via a gateway 12a having a predetermined function. The general control apparatus 12 includes a recording medium 12b for storing predetermined data and a CPU 12c for controlling the entirety of the program data rewriting apparatus. The second control apparatus 13, in which program data thereof is to be rewritten, includes a recording medium 13a for storing predetermined data and a CPU 13b which can perform an optimum control in accordance with a predetermined input signal. The network coupling among the general control apparatus 12, respective control apparatuses 13, 14, gateway 12a and first control apparatus 11 may be realized by a wire means or a wireless means.

FIG. 1B is a diagram showing an example of the concrete configuration of the first control apparatus 11. As shown in FIG. 1B, the first control apparatus 11 includes a data input portion 11a such as a slot for inputting a recording medium such as an optical disc thereinto, a storage device 11e for temporarily storing data from the data input portion 11a therein, a CPU 11d for controlling the entirety of the first control apparatus 11, a first interface 11c constituting an input/output interface between the gateway 12a an the first control apparatus 11, and a second interface 11b for outputting map data etc. to the output portion of a display portion in the case of a car navigation apparatus, for example.

In the first control apparatus 11, according to the aforesaid configuration, program rewriting data inputted from the data input portion 11a is outputted to the gateway 12a via the first interface 11c under the control of the CPU 11d. The gateway 12a has a buffer function in a manner that, in the general control apparatus 12, the program rewriting data is temporarily stored in the recording medium 12b and is transferred to the control apparatuses 13, 14 under a certain condition in accordance with the determination of the CPU 12c. Preferably, the gateway 12a is provided with a function of checking the security of the inputted program data, for example, between the input/output interface and the input interface and the output interface.

Figure 2:
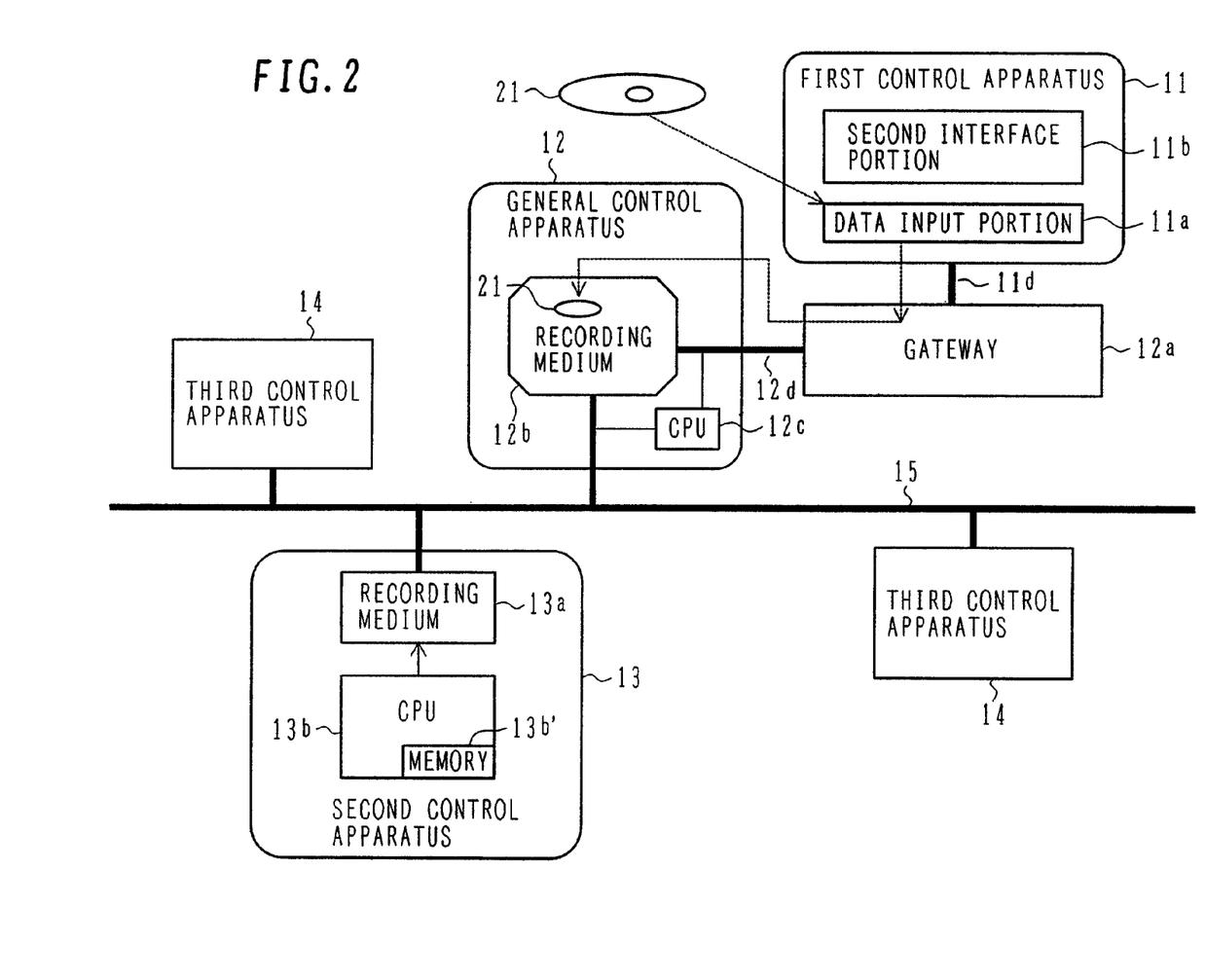
FIG. 2 is a diagram showing a program rewriting procedure in the program data rewriting system of FIG. 1A.

The explanation will be made with reference to FIG. 2 as to an example of the processing of storing program data in the recording medium 12b of the general control apparatus 12 coupled to the network in the system including the program data rewriting apparatus according to the embodiment. FIG. 2 corresponds to FIG. 1 and is a diagram showing the procedure of sending data to the second control apparatus 13 which is a subject control apparatus in which program data thereof is rewritten. In FIG. 2, the explanation will be made as to an example in which program data is sent to the recording medium 13a of the second control apparatus 13, for example.

The program data may be supplied according to one of the following two modes. That is, according to one of the two modes, program data stored in an independent recording medium such as an optical disc 21, a compact disc (CD), a DVD, a hard disc is read by a disc drive apparatus. According to the other of the two modes, program data is supplied from the outside by means of radio wave or a radio signal from a mobile phone etc. The program data 21 thus supplied in such the mode is taken into the program data rewriting apparatus via the first control apparatus 11 having the interface function with the outside. The program data 21 thus fetched by the first control apparatus 11 having the interface function with the outside is taken into the gateway 12a via a signal path 11d. The gateway 12a has a function of performing the security check of the program data 21 to confirm that abnormal or harmful data is not contained in the program data. Next, the program data 21 passed through the gateway 12a is stored via a signal path 12d in the recording medium 12b contained in the general control apparatus 12 which generally controls the control apparatuses 13, 14 coupled to the network 15 of the vehicle.

Data stored in the recording medium 12b includes, for example, an ID of the control apparatus as a rewritten subject for designating the control apparatus to be rewritten among the control apparatuses considered to be rewritten, and further includes rewriting program data for the control apparatus as the rewritten subject. The ID and the rewriting program data relating to one or the plural control apparatuses are stored in the recording medium 12b in a table format. Such a rewriting condition table may include a temporal rewriting condition.

Although the explanation is made as to the case where one kind of program data is stored in the recording medium 12b of the general control apparatus 12 via the aforesaid path, instead thereof, it is possible to store and buffer plural kinds of program data in the recording medium 12b via the same path.

Figure 3:
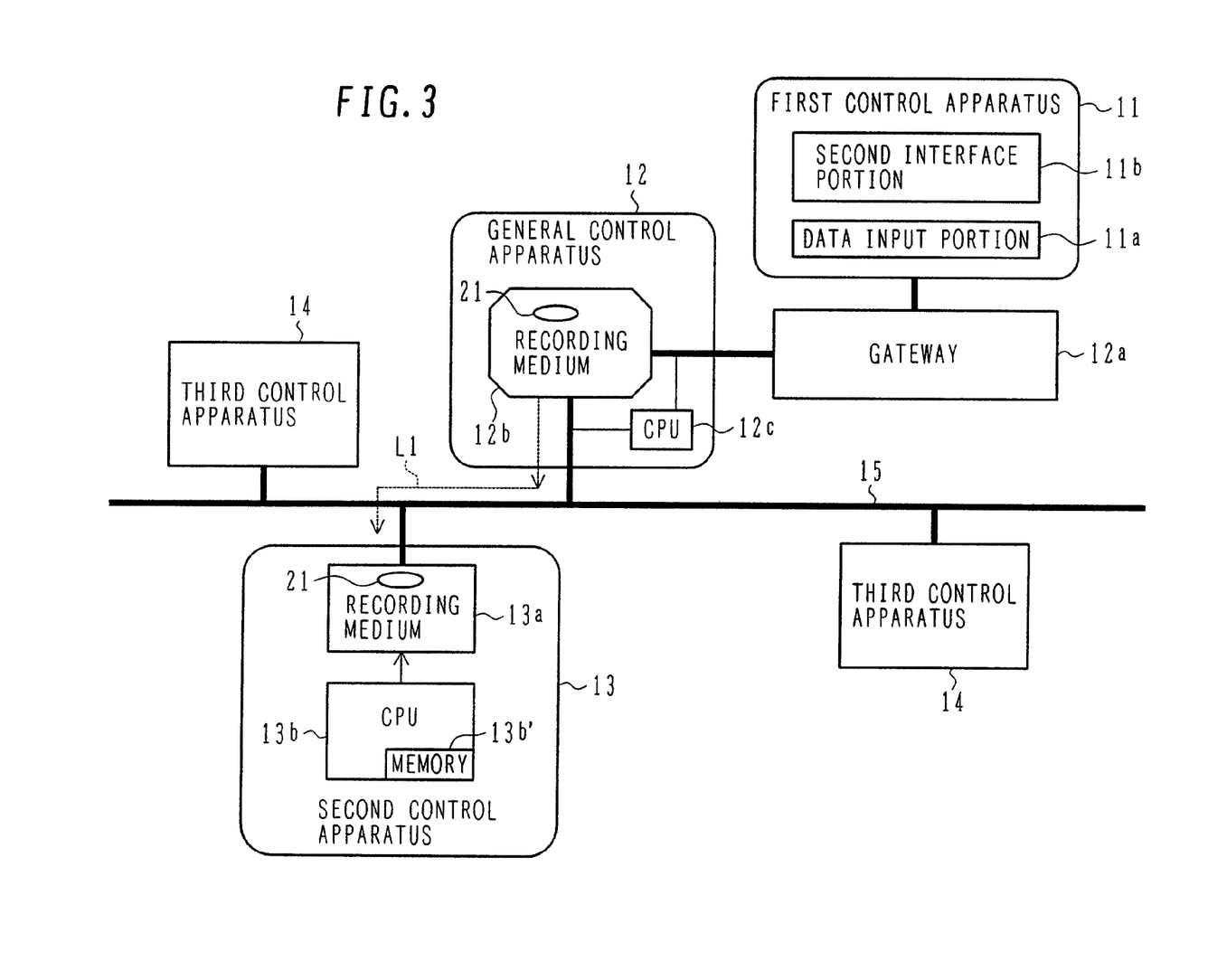
FIG. 3 is a diagram showing a program rewriting procedure succeeding to the procedure of FIG. 2.

Next, as shown in FIG. 3, the program data stored in the recording medium of the general control apparatus 12 coupled to the network is stored in the recording medium of the control apparatus as the rewritten subject of program data in the following manner. First, the program data 21 stored in the recording medium 12b contained in the general control apparatus 12 is sent via the network 15 of the vehicle to the recording medium 13a of the second control apparatus 13 as the rewritten subject of program data (see a path L1). In this case, the program data 21 stored in the recording medium 12b contained in the general control apparatus 12 for generally controlling the control apparatuses 13, 14 is sent to the network 15 of the vehicle when it is determined to be optimum by the CPU 12c of the general control apparatus 12. The program data sent to the network 15 of the vehicle is sent via the network 15 of the vehicle to the second control apparatus 13 as the rewritten subject of program data. Then, the second control apparatus 13 as the rewritten subject of program data stores the program data 21 sent via the network 15 of the vehicle into the recording medium 13a.

In the aforesaid system including the program data rewriting apparatus, in the case where the second control apparatus 13 as the rewritten subject of program data is disposed under a severe environment such as severe temperature near the engine or the transmission of the vehicle etc., there arises a problem if the program data rewriting procedure is executed in the case where the temperature exceeds a range in which the recording medium 13a contained in the second control apparatus 13 as the rewritten subject of program data operates normally and accurately. Further, in the case where the second control apparatus 13 as the rewritten subject of program data is disposed in such the environment, a power supply etc. for supplying electric power to the second control apparatus 13 may also be unstable in its operation. Thus, there may arise a case that the program data can not be rewritten normally when the program data rewriting procedure is executed under such a bad condition.

Then the explanation will be made with reference to FIG. 4 as to an embodiment in which program data can be surely and safely rewritten even when the second control apparatus 13 as the rewritten subject of program data is disposed in a bad environment.

Figure 4:
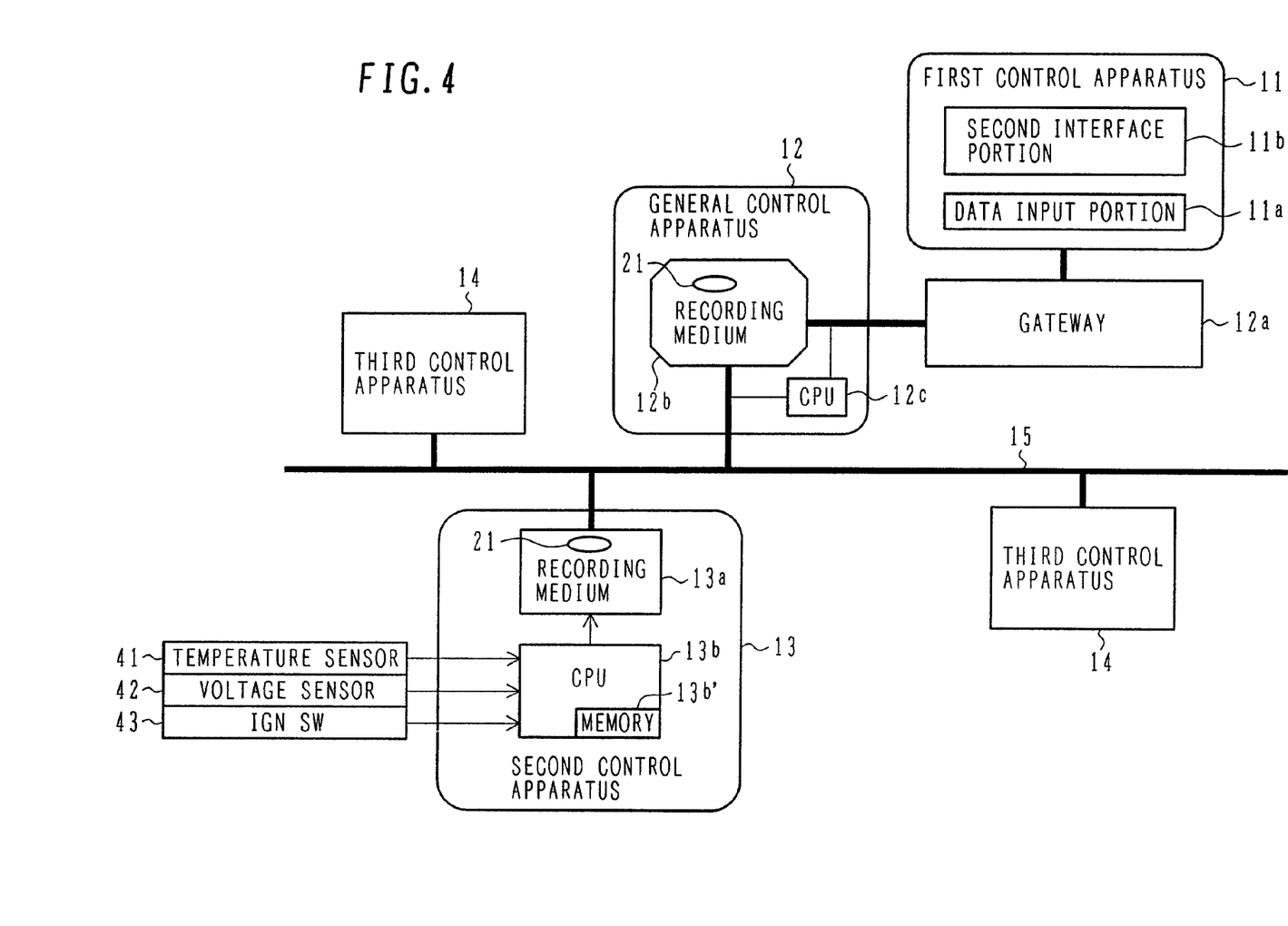
FIG. 4 is a diagram showing a more concrete example of the program data rewriting system corresponding to FIG. 1A.

As shown in FIG. 4, the program data rewriting apparatus according to the embodiment includes a temperature sensor 41 for measuring the temperature neat the second control apparatus 13 as the rewritten subject of program data, a voltage sensor 42 for measuring the voltage of the second control apparatus 13 as the rewritten subject of program data, and an ignition switch (IGN SW) 43 for changing the operation of the engine of a vehicle between the start and stop of the engine. A CPU 13b within the second control apparatus 13 monitors the states of the temperature sensor 41, the voltage sensor 42 and the IGN SW 43. A reference numeral 13b' depicts a storage device for storing data monitored by the CPU. That is, the reference numeral 13b' depicts a memory such as a flash ROM which is provided within each of the control apparatuses such as the second control apparatus 13 and stores various data. The memory 13b' stores reference values which are compared with the measured values from the sensors such as the temperature sensor 41 and the voltage sensor 42 thereby to determine a timing for copying or transferring rewriting data from the general control apparatus 12. The reference values can be suitably changed by the operation of a user (or a maker), for example.

Figure 5:
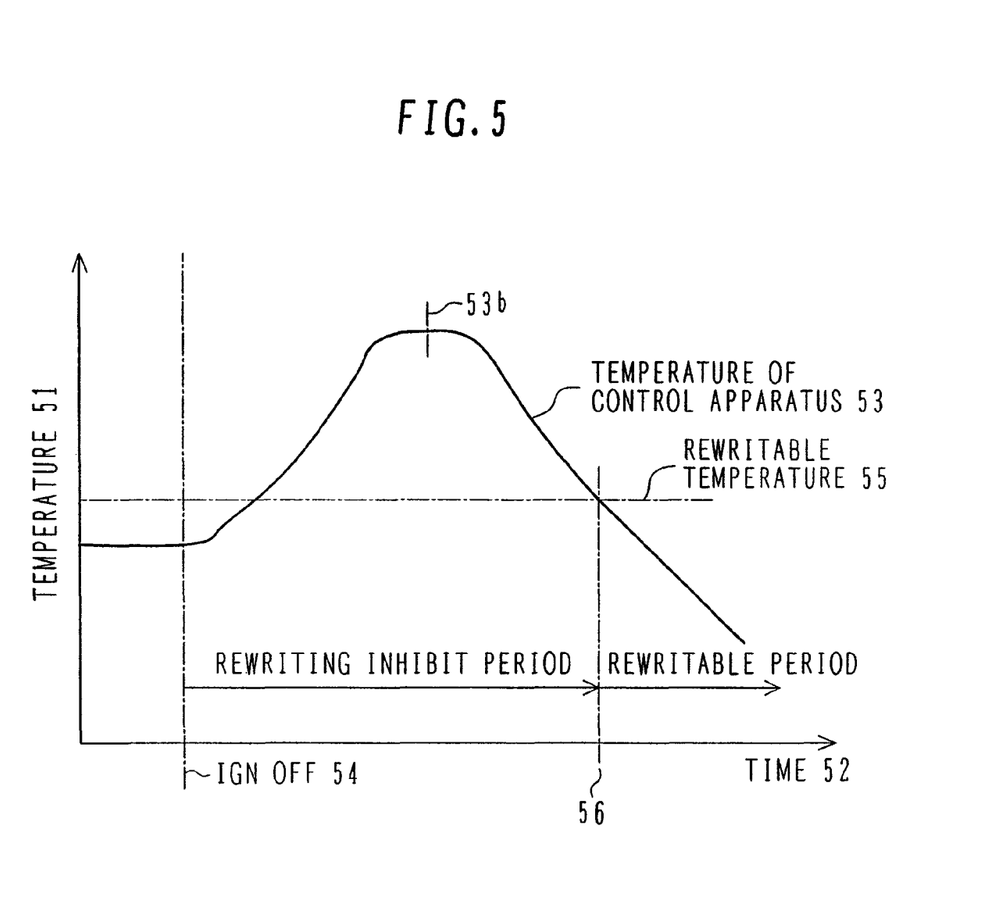
FIG. 5 is an example of a temperature profile of the apparatus disposed near the engine of transmission of a vehicle.

The explanation will be made with reference to FIG. 5 as to an example of a concrete temperature profile in the case where the second control apparatus 13 as the rewritten subject of program data is disposed near the transmission. As shown in FIG. 5, in the example of the temperature profile, an ordinate represents the temperature axis 51 and an abscissa represents the time axis 52. On the temperature axis 51, there is shown a program data rewritable upper limit temperature 55 which is the upper limit of the temperature equal to or under which program data can be surely and safely rewritten. The temperature 53 of the control apparatus increases gradually with the time lapse after the turning-off time point 54 of the IGN SW (IGN OFF 54) and exceeds the program data rewritable upper limit temperature 55 upon the lapse of a predetermined time period and then reaches a peak temperature 53b. Thereafter, the control apparatus temperature 53 reduces gradually and then reaches again a temperature lower than the program data rewritable upper limit temperature 55. That is, in the case of the control apparatus having such the temperature profile, it will be understood that await time in order to rewrite program data surely and suitably is a time period from the turning-off time point 54 (IGN OFF 54) to a time point 51 where the control apparatus temperature 53 reduces below the program data rewritable upper limit temperature 55. This time period between the turning-off time point 54 to the time point 51 is a rewriting inhibit time period and a time period after the time point 51 is a rewritable time period.

Next, the explanation will be made with reference mainly to FIG. 6 and also with reference to other figures suitably as to the program data rewriting procedure according to the embodiment. The general control apparatus 12 receives program data via the gateway 12a and stores the received program data into the recording medium 12b. First, in step 61, program data sent via the network 15 of a vehicle is received. Then, it is determined whether or not a program data rewriting execution instruction is contained in the received program data (step 62). When it is determined that the program data of the second control apparatus 13 as the rewritten subject of program data is not rewritten by the received program data, the process proceeds to step 68 and the program data rewriting procedure is not executed. In contrast, when the program data rewriting execution instruction is contained in the received program data, the process proceeds to step 63. In step 63, it is determined whether or not the engine of the vehicle is stopped. In the control apparatus in which the program data rewriting procedure is executed, if the program data rewriting procedure is executed during the running or engine rotation of the vehicle, it is considered that the vehicle itself or the crew falls into a dangerous situation. Thus, it is determined whether or not the engine of the vehicle is stopped. When it is determined in step 63 that the engine is rotating, the process proceeds to step 68 and the program data rewriting procedure is not executed. In contrast, when it is determined in step 63 that the engine is stopped, the process proceeds to step 64, whereat it is determined whether or not a predetermined time period has passed after the engine stop. This step is provided by the following reason. That is, when the control apparatus in which the program data rewriting procedure is executed is disposed near the engine or the transmission, it is feared that the temperature environment is degraded. Further, it is feared that the program data rewriting procedure is executed in the temperature state where the recording medium contained within the control apparatus does not operate normally nor safely. Accordingly, the time period until the temperature reduces to a value where the recording medium can operate normally and safely after the turning-off of the ignition switch is set in advance. When it is determined in step 64 that the predetermined time period has not lapsed yet after the engine stop, this loop is repeatedly executed until the predetermined time period has lapsed. In contrast, when it is determined in step 64 that the predetermined time period has lapsed after the engine stop, the process proceeds to step 65, at which it is determined whether or not the temperature of the control apparatus is within the predetermined range. In step 65, when the temperature measured by the temperature sensor provided at the outside of the control apparatus or within the control apparatus is not within the predetermined range where the program data rewriting procedure can be executed normally and safely as to the recording medium contained in the control apparatus, the process proceeds to step 68 and the program data rewriting procedure is not executed. In contrast, when the measured temperature is determined to be within the predetermined range, the process proceeds to step 66. In step 66, it is determined whether or not the voltage of the control apparatus 13 as the rewritten subject is within a predetermined range. In step 66, when the voltage measured by the voltage sensor provided at the outside of the control apparatus 13 or within the control apparatus 13 is not within the predetermined range where the program data rewriting procedure can be executed normally and safely as to the recording medium contained in the control apparatus, the process proceeds to step 68 and the program data rewriting procedure is not executed. In contrast, when the measured voltage value is determined to be within the predetermined range, the process proceeds to step 67, whereat the program data rewriting procedure is executed.

Figure 6:
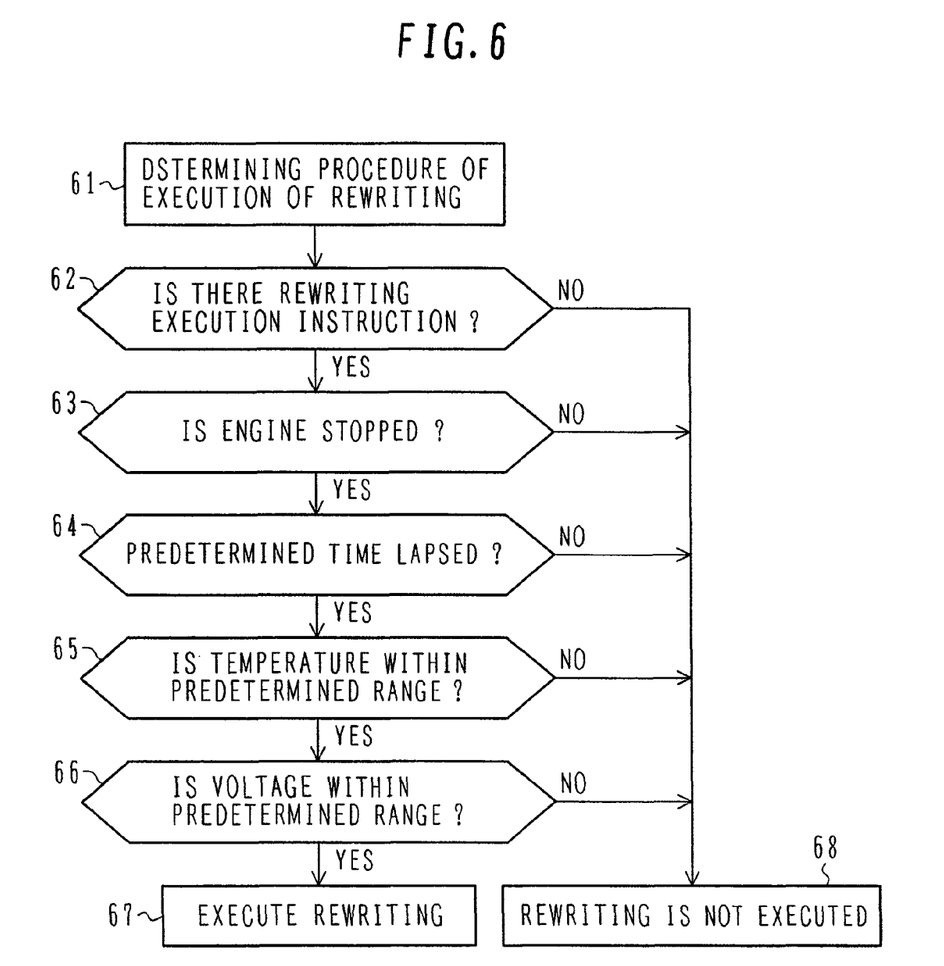
FIG. 6 is a flowchart showing the procedure according to the embodiment.

Although each of steps 62 to 66 is arranged to determine whether or not the program data rewriting procedure is to be executed in FIG. 6, the similar effects can be obtained when the execution order of these steps is changed.

Depending on the function of the control apparatus in which program data thereof is rewritten, some of steps 62 to 66 may be selectively executed instead of executing all steps 62 to 66.

First Embodiment

A concrete example of this embodiment will be explained. The explanation will be made as to an example where the present technique of the embodiment is applied to the case that rewritable program data is rewritten only for one or more vehicle having a particular ID representing a certain type of vehicle, for example, before the shipment of the vehicle in a state that many vehicles (automobiles) of plural types are disposed.

At the time of rewriting program data, a person who rewrites program data (a manager of the factory of a vehicle (automobile) manufacturing company, for example) sends to and once stores, in the recording medium 12*b* of the general control apparatus 12, an ID representing a type of vehicle as a rewritten subject, a rewriting execution condition satisfying a rewriting condition such as writing timing and rewriting program data. Thereafter, when the rewriting execution condition is satisfied, the data as a subject for rewriting buffered within the recording medium 12*b* is transferred to the recording medium 13*a* of the second control apparatus 13 from the recording medium 12*b*. Thus, the program of the second control apparatus 13 can be rewritten by the transferred data.

In this manner, software can be rewritten selectively among many vehicles (automobiles). Incidentally, the program data buffered within the general control apparatus 12 may be transferred to the second control apparatus 13 as a rewritten subject.

A plurality of the general control apparatuses may be provided within a vehicle. Alternatively, one or more of the plural control apparatuses within a vehicle may be selected as the general control apparatus.

As described above, the embodiments can provide the technique which can rewrite efficiently and safely the program data of the control apparatuses coupled to the network of a vehicle.

In this manner, the present invention can be applied to the technique for rewriting program data as to the control apparatus within a vehicle such as an automobile.

What is claimed is:

1. A program data rewriting system for a control apparatus in a vehicle having a plurality of control apparatuses, said system comprising:
    a general controller, which is coupled to a network and includes a first recording medium for storing program data as a rewriting subject; and
    a plurality of controllers, each of which is coupled to the network and includes a second recording medium for storing program data for actuating a function of the control apparatus in a manner capable of being updated;
    wherein at least one of said controllers includes
        an environmental data measuring unit which measures at least one of a temperature, a voltage, and a lapsed time after stopping of an engine of the vehicle as environmental data around the controller;
        a third recording medium, which stores reference data that is compared with the environmental data measured by the environmental data measuring unit to determine whether or not a condition is satisfied; and
        a comparing unit, which compares the environmental data with the reference data; and
    wherein said program data stored in said second recording medium is rewritten when said environmental data is within a predetermined range determined by said reference data.

2. A program data rewriting system according to claim 1, wherein
    the first recording medium stores therein, in addition to the program data, an identifier and a condition for transferring data from the recording medium to the second recording medium so as to rewrite the program data; and
    the identifier specifies the controllers as a subject in which program data thereof is rewritten.

3. A program data rewriting system according to claim 2, further comprising an input for data that is coupled to the general controller and has an interface between the general controller and outside of the vehicle 4. A program data rewriting system according to claim 3, wherein the input for data has an interface for obtaining data, including the program data, from outside of the vehicle.

5. A program data rewriting system according to claim 3, further comprising a gateway provided between the input for data and the general controller that checks security of data, including the program data, of the rewriting subject.

* * * * *